United States Patent [19]
Tanaka et al.

[11] Patent Number: 5,359,442
[45] Date of Patent: Oct. 25, 1994

[54] APPARATUS AND METHOD FOR INTRODUCING LIQUID CRYSTAL INTO LIQUID CRYSTAL CELLS USING SUCTION AND RETENTION MEANS

[75] Inventors: Kenji Tanaka; Haruo Kato, both of Kyoto, Japan

[73] Assignee: Rohm Co., Ltd., Kyoto, Japan

[21] Appl. No.: 979,282

[22] Filed: Nov. 20, 1992

[30] Foreign Application Priority Data

Nov. 22, 1991 [JP] Japan ................... 3-307715

[51] Int. Cl.⁵ .................. G02F 1/1335; G02F 1/1339
[52] U.S. Cl. ........................................ 359/62; 359/80
[58] Field of Search .................... 359/62, 80

[56] References Cited

FOREIGN PATENT DOCUMENTS 0282305  9/1990  Fed. Rep. of Germany ........ 359/62
63-53518  3/1988  Japan .
2-239225  9/1990  Japan ................................. 359/62

Primary Examiner—Anita Pellman Gross
Attorney, Agent, or Firm—William H. Eilberg

[57] ABSTRACT

An apparatus is provided for reliably introducing, without waste, an adequate amount of liquid crystal into a liquid crystal cell by a simple operation. The apparatus comprises a holding member for holding each of the liquid crystal cells, a liquid crystal retention member wetted with liquid crystal withdrawn by a liquid crystal suction member, a drive device for causing relative movement between the holding member and the liquid crystal retention member to selectively bring a liquid crystal inlet of each liquid crystal cell into and out of contact with the liquid crystal retention member, and a vacuum vessel accommodating the holding member, liquid crystal suction member, liquid crystal retention member and drive device, the vacuum vessel being capable of varying its inner pressure.

12 Claims, 8 Drawing Sheets

APPARATUS AND METHOD FOR INTRODUCING LIQUID CRYSTAL INTO LIQUID CRYSTAL CELLS USING SUCTION AND RETENTION MEANS

BACKGROUND OF THE INVENTION

1. Field of the Invention

This invention relates to an apparatus and method for introducing liquid crystal into liquid crystal cells and, more particularly, to an apparatus and method which permit introduction of an adequate amount of liquid crystal into liquid cells efficiently and automatically.

2. Description of the Prior Art

A liquid crystal cell of a liquid crystal display is fabricated by sealing liquid crystal in a cell which comprises two, slightly spaced-apart glass plates facing each other. The cell has a transparent electrode formed on the inner surface of each of the two glass plates. When the transparent electrodes are energized, a display is provided on it according to the pattern of the electrodes.

FIG. 9 shows such a liquid crystal cell 1. As shown in the Figure, two glass plates 2 are bonded together by an adhesive spacer 3 which is coated such as to enclose a display area and separate the glass plates 2 by a predetermined minute distance.

The cell thus has an inner space defined by the two glass plates and the adhesive spacer intervening therebetween in a dam-like fashion such as to enclose the display area. Liquid crystal is sealed in this cell. To seal liquid crystal, the adhesive spacer intervening in the dam-like fashion between the two glass plates has a gap 5, which serves as an inlet 6 for introducing liquid crystal therethrough.

To seal liquid crystal in the entire inner space of the cells 4 having the above structure, liquid crystal is introduced in the following way.

A plurality of cells 4 are held with their liquid crystal inlet 6 directed downward on a magazine or like holding means 7, which is disposed in a vacuum vessel (not shown). The vacuum vessel is then evacuated to sufficiently purge the air in each of the cells 4. Then, the inlet 6 of each cells 4 is brought into contact with the surface of liquid crystal provided in a lower liquid crystal boat This may be effected by lowering the magazine 7. To save as much liquid crystal as possible, attached to the lower edge of each cell 4, the liquid crystal boat has a structure like a narrow groove so that the liquid crystal provided therein has a convex surface owing to its surface tension.

With the inlet of the cell held in contact with and closed by the liquid crystal surface in the above way, the pressure in the vacuum vessel is then increased. By so doing, the liquid crystal is introduced through the inlet into the inner space of the cell with increase of the external pressure.

Thereafter, the cell containing the introduced liquid crystal is taken out of the vacuum vessel, and liquid crystal attached to the cell lower edge is removed by wiping, for instance. The inlet is then sealed using an ultraviolet-ray-setting resin or like sealing material.

The above method of sealing liquid crystal has the following problems.

Firstly, the formation of the convex liquid crystal surface on the liquid crystal boat by utilizing the surface tension is very difficult to control. Inadequate control may result in that a large amount of liquid crystal is spilled when the cell inlet contacts the liquid surface, and that air bubbles are introduced into the cell when the inner pressure of the vacuum vessel is increased. To preclude the generation of such air bubbles, one must hold the liquid crystal surface at a predetermined convex shape by utilizing the surface tension, but it is a delicate control and very difficult.

As a second problem, the liquid crystal boat 8 has a structure like a narrow groove, and its volume is comparatively small. Therefore, for controlling the liquid crystal surface control it is necessary to replenish the liquid crystal boat for every liquid crystal introduction by reducing and then increasing the vacuum vessel pressure. Such replenishing operation is again very cumbersome.

As a third problem, even if liquid crystal could be successfully introduced in a predetermined amount in the cell, it is introduced by holding the inlet of the cell in contact with and closed by its surface. Therefore, even by minimizing the contact area of the cell lower edge with the inlet by forming the convex liquid crystal surface by utilizing the surface tension thereof, excess liquid crystal is more or less attached to the cell when the cell is separated from the liquid crystal surface after introduction of liquid crystal. Although such excess liquid attached to one cell is slight in amount, it amounts to be considerable with repeated liquid crystal introduction operations carried out for a large number of cells. Such excess crystal liquid is only removed by wiping or the like and can not be used again. This means a great loss of liquid crystal.

FIG. 8 shows a measure to solve the above problems posed when sealing liquid crystal by using the liquid crystal boat having a structure like a narrow groove, that is, the difficulty of the liquid crystal surface control and the cumbersome replenishment of liquid crystal. In this case, the lower edge of cell vessels is dipped in a comparatively large amount of liquid crystal contained in a liquid crystal trough 9. In this case, however, a large amount of liquid crystal is attached not only to the lower edge of each cell but also to the magazine holding the cells, thus resulting in great loss of liquid crystal. Currently, therefore, this method is unfeasible.

An object of the invention, accordingly, is to provide an apparatus and a method for introducing liquid crystal into liquid crystal cells, which permit reliable introduction of a proper amount of liquid crystal into each liquid crystal cell with a simple operation and without loss of liquid crystal.

SUMMARY OF THE INVENTION

To attain the above object of the invention, there is provided an apparatus for introducing liquid crystal into liquid crystal cells, which comprises holding means for holding each of the liquid crystal cells;

liquid crystal retention means wetted with liquid crystal withdrawn by liquid crystal suction means;

drive means for causing relative movement between the holding means and the liquid crystal retention means to selectively bring a liquid crystal inlet of each liquid crystal cell into and out of contact with the liquid crystal retention means; and a vacuum vessel accommodating the holding means, liquid crystal suction means, liquid crystal retention means and drive means, the vacuum vessel being capable of varying its inner pressure.

In a preferred form of the invention, the liquid crystal retention means is directed upward, whereas the holding means holds each liquid crystal cell with its liquid crystal inlet directed downward and is located above the liquid crystal retention means.

In an alternative preferred form of the invention, the liquid crystal retention means is directed downward, whereas the holding means holds each liquid crystal cell with its liquid crystal inlet directed upward and is located below the liquid crystal retention means.

According to the invention, there is further provided a method of introducing liquid crystal into liquid crystal cells, which uses the above liquid crystal introduction apparatus and has the steps of:

(1) evacuating the vacuum vessel;
(2) bringing the inlet of each liquid crystal cell into contact with the liquid crystal retention means while the vacuum vessel is held evacuated; and
(3) increasing the inner pressure of the vacuum vessel.

As is seen, a feature of the invention resides in the liquid retention means wetted by liquid crystal, which replaces the prior art liquid crystal surface to be held in contact with the liquid crystal inlet of liquid crystal cells in the evacuated inner space of the vacuum vessel.

The liquid crystal retention means may be constructed using a felt member or the like made of fibers capable of being satisfactorily wetted by liquid crystal. To hold the liquid crystal retention means in an adequately wetted state at all times, liquid crystal suction means utilizing capillary action may be coupled to the liquid crystal retention means and partly dipped in an adequately disposed liquid pool.

Such liquid crystal suction and retention means have a character of naturally replenishing with new liquid crystal according to the consumption of liquid crystal in the liquid crystal retention means. Thus, the liquid crystal retention means can be held wetted at all times so long as the suction means is partly dipped in liquid crystal.

After air in each cell is purged by evacuating the vacuum vessel, the inlet of each cell is brought into contact with the liquid crystal retention means, and then the inner pressure of the vacuum vessel is increased. As a result, liquid crystal retained by the wetted liquid crystal retention means is caused by the external pressure to be introduced into the cell. After the introduction of liquid crystal, the cell is taken out of the vacuum vessel for sealing the inlet using an ultraviolet-ray-setting resin or like material as in the prior art.

Since the liquid crystal retention means such as a felt member held wetted by liquid crystal is used for and in lieu of a mere liquid crystal surface as in the prior art, there is no need for liquid crystal surface control, and it is only the positional relation between the liquid crystal retention means and liquid crystal cell inlet contacted thereby that is to be considered. Besides, it is a basis that the liquid crystal retention means has a predetermined shape retention force. Thus, the liquid crystal cell inlet can be brought into contact with the liquid crystal to be introduced by merely bringing it into contact with the liquid crystal retention means. This means that the positional relation between the liquid crystal retention means and the liquid crystal may be very easily controlled with vertical drive means, for instance.

Further, since the liquid crystal retention means is not a mere liquid crystal surface, unlike the case of dipping the liquid crystal cell lower edge in liquid crystal, it is possible to avoid wasteful attachment of a great amount of excess liquid crystal and minimize the attachment thereof.

Moreover, the liquid crystal for partly dipping the suction means therein may be held in a large volume liquid crystal trough, and frequent replenishment with liquid crystal is unnecessary.

As discussed above, according to the invention it is possible to minimize the waste of liquid crystal, preclude the liquid crystal surface control and greatly reduce the liquid crystal replenishment frequency. Thus, the invention permits easy and reliable introduction of liquid crystal into each cell, and reduces the waste of liquid crystal, thus solving all the problems inherent in the prior art.

The above and other objects and features of the invention will become more apparent from the description hereinbelow with reference to the accompanying drawings.

DETAILED DESCRIPTION OF THE PREFERRED EMBODIMENTS

Figure 1:
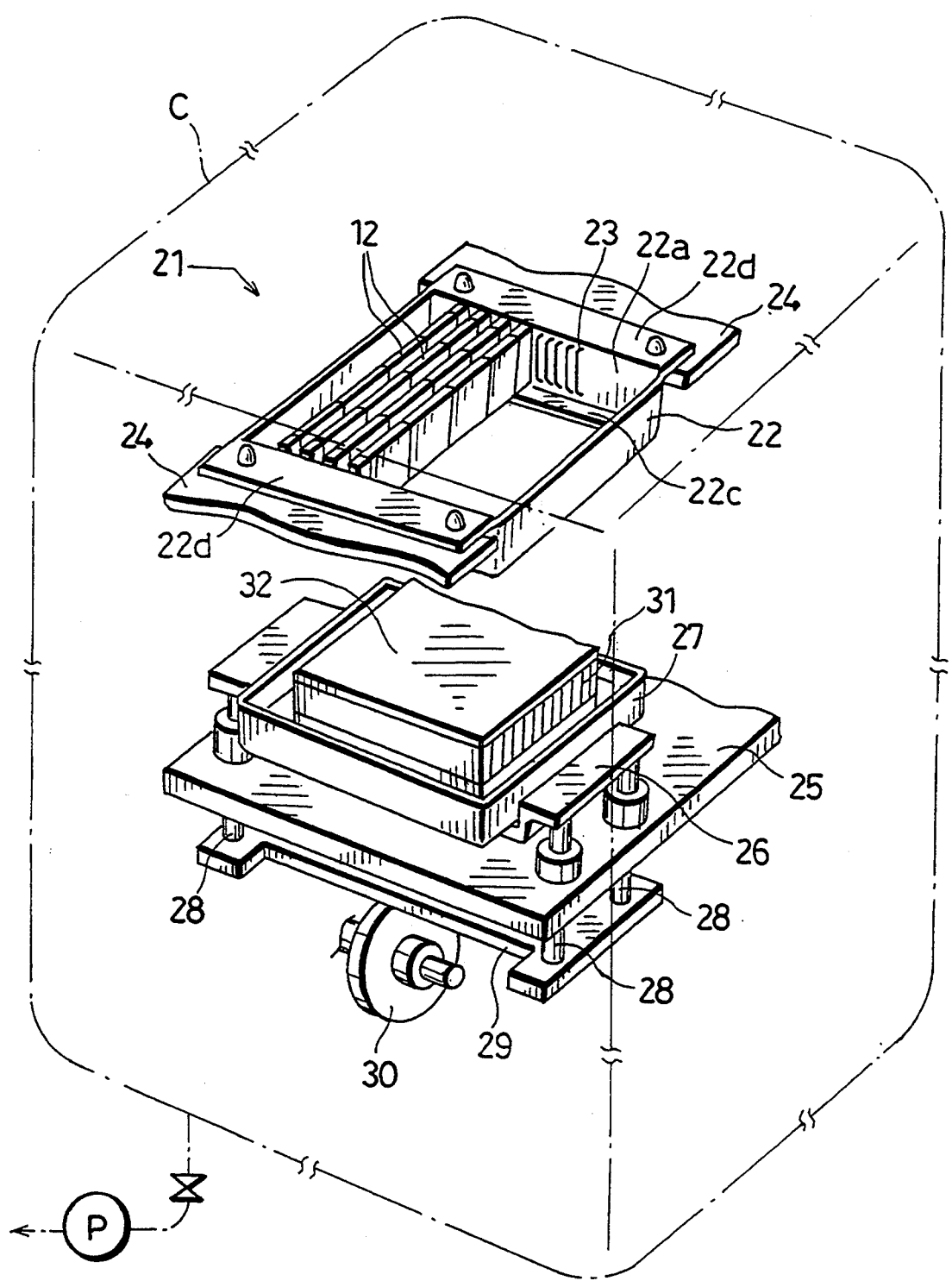
FIG. 1 is an exploded perspective view showing an embodiment of the liquid crystal introduction apparatus according to the invention.
Figure 2:
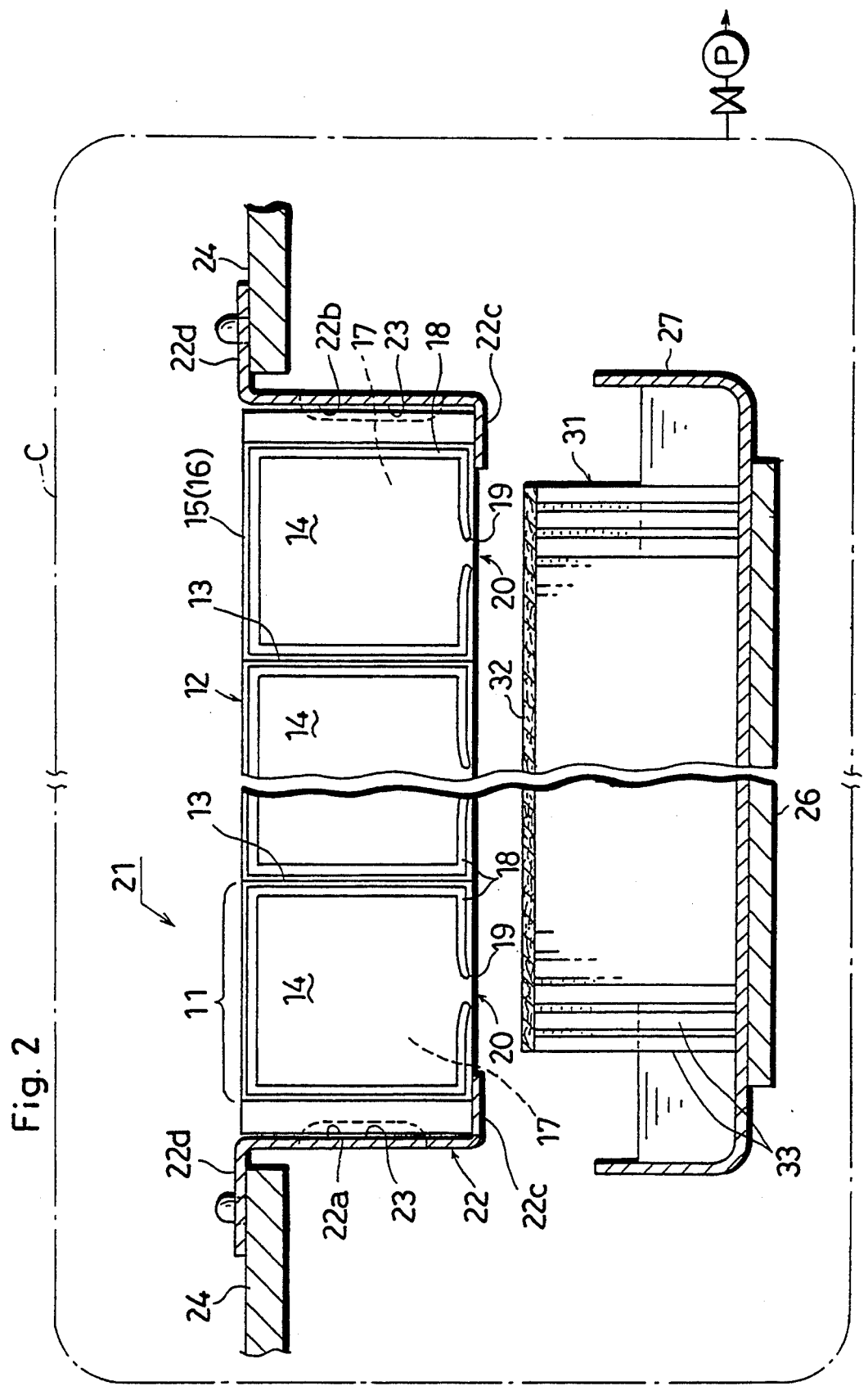
FIG. 2 is a fragmentary sectional view, to an enlarged scale, showing the embodiment shown in FIG. 1.
Figure 7:
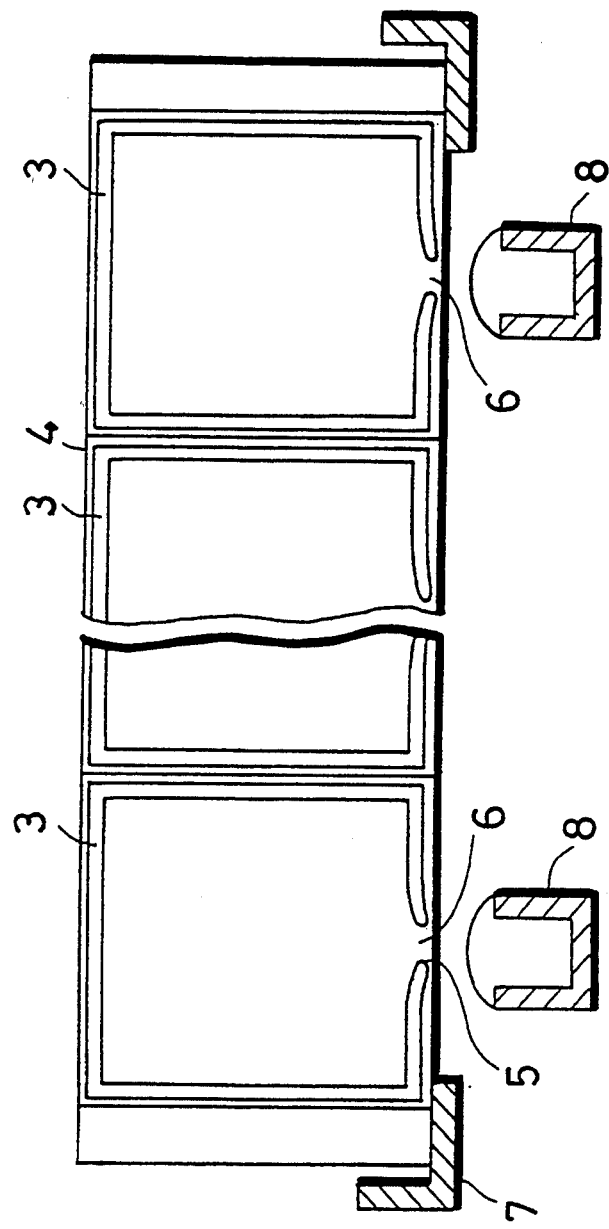
FIG. 7 is a sectional view for explaining a prior art liquid crystal introduction method.
Figure 8:
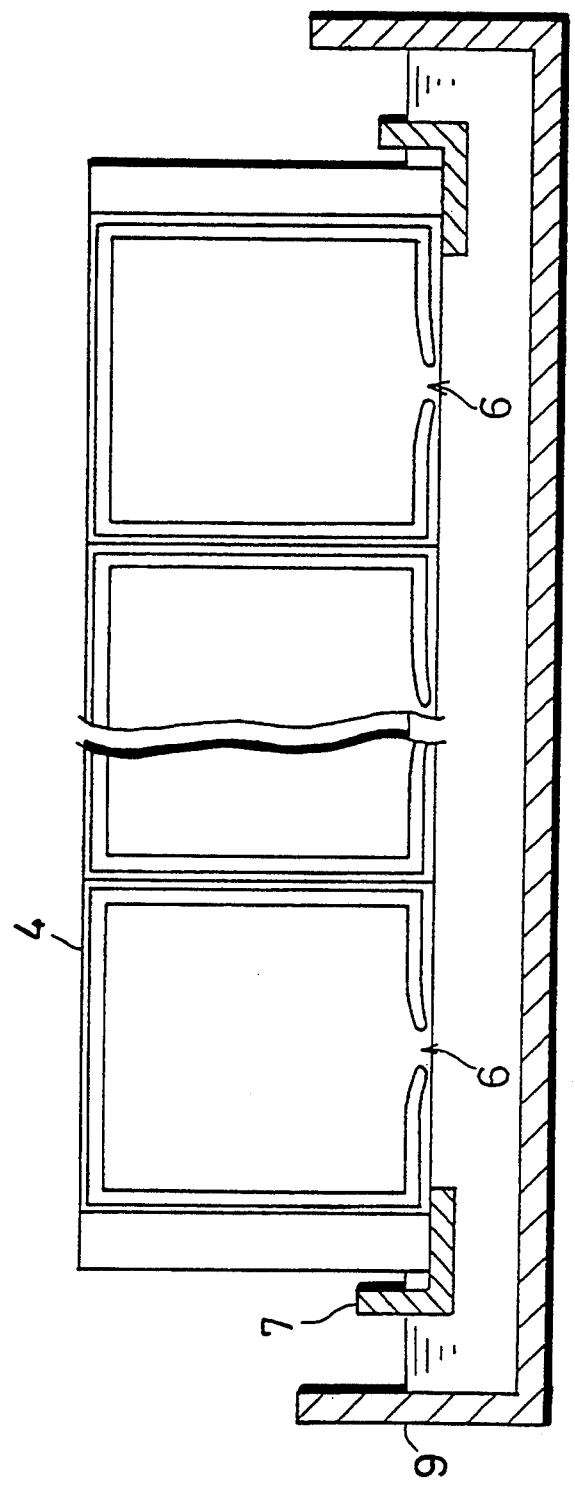
FIG. 8 is a sectional view f,or explaining a different prior art liquid crystal introduction method.
Figure 9:
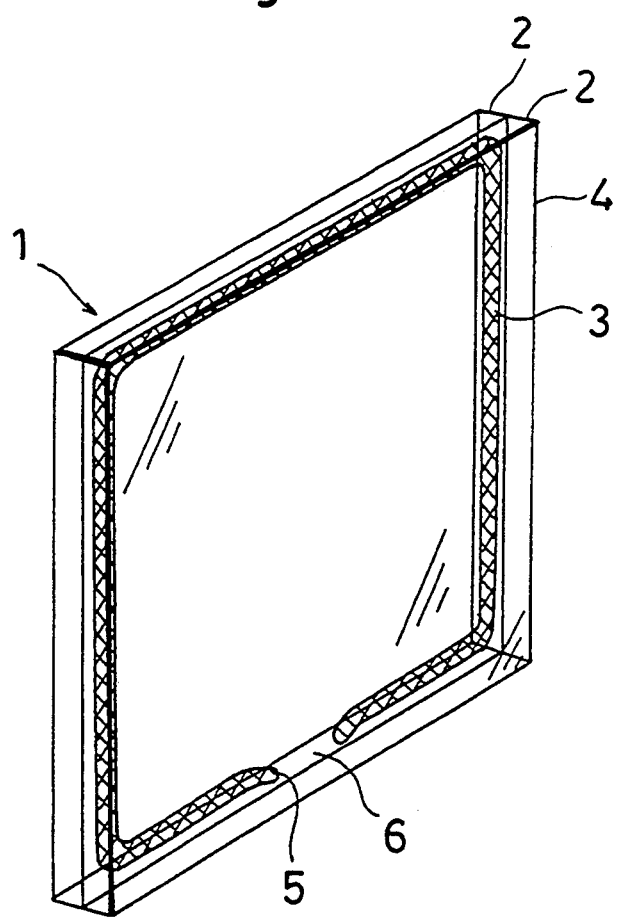
FIG. 9 is a perspective view showing an example of cell used in accordance with the invention.

FIGS. 1 and 2 show an embodiment of the invention. Referring to the FIG. 2, designated at 12 is a liquid crystal cell train from which each liquid crystal cell 11 is cut apart. Each liquid crystal cell 11 like that shown in FIG. 7 is formed in each of areas 14 defined between separation lines 13. It comprises two spaced-apart glass plates 15 and 16 bonded together by a resin spacer 18 such that a thin inner liquid crystal seal space 17 is formed. The resin spacer 18 intervening between the two glass plates 15 and 16 such as to enclose a display area has a gap 19 which forms a liquid crystal inlet 20. The inner surfaces of the glass plates 15 and 16 of course have predetermined transparent electrode or electrodes and deflection plate or plates applied to them.

After liquid crystal is sealed in the liquid crystal seal space 17 in each of the liquid crystal cells 11 in the train 12, each liquid crystal cell 11 is cut apart along each separation line 13.

FIG. 1 is an exploded perspective view showing an example of liquid crystal introduction apparatus 21 for introducing liquid crystal into each liquid crystal cell 11 in the liquid crystal cell train 12 by the method according to the invention.

The whole set-up shown in FIG. 1 is provided in a vacuum vessel as schematically shown by phantom line C. The inner pressure of the vacuum vessel C can be varied by a pump (not shown) connected thereto. The construction of such a vacuum vessel is well known and does not require any description.

Designated at 22 is a magazine, which can hold a plurality of liquid crystal cell trains 12. The magazine 22 is a frame, which is rectangular in plan view. The opposite end walls 22a and 22b of the magazine have a plurality of uniformly spaced-apart vertical guide grooves 23 for vertically guiding the ends of the cell trains 12. The magazine 22 further has opposite end flanges 22c provided adjacent the upright end walls 22a and 22b such that the opposite ends of the cell trains 12 can rest on these end flanges 22c. The magazine further has outer flanges 22d extending outward from the upper edge of the end walls 22a and 22b. The magazine is loaded in the vacuum vessel C with the outer flanges 22c supported by a magazine holder 24, and the plurality of uniformly spaced-apart cell trains 12 held upright with the liquid crystal inlet 12 of each liquid crystal cell directed downward.

Since the magazine 22 has a frame-like structure, the inlet 20 of each liquid crystal cell 11 can be held open downward.

Underneath the loaded magazine 22, a liquid crystal trough holder 26 is provided, which can be driven vertically with respect to a support base 25. A liquid crystal trough 27 is supported on the holder 26. In this embodiment, the holder 26 is vertically driven by a mechanism, which comprises four guide rods depending from the corners of the holder 26 and slidably penetrating the support base 25, a connecting plate 29 connected to the lower end of each of the guide rods 28, and a rotational cam disk 30 with the periphery thereof held in contact with the lower surface of the connecting plate 29. Thus, by rotating the cam disk 30, the holder 26 is moved vertically according to the shape of the cam disk periphery.

According to the invention, a liquid crystal retainer 32 is provided, which can be wetted by liquid crystal withdrawn by a suction member 31 dipped in liquid crystal contained in the liquid crystal trough 27 noted above. In this embodiment, the suction member 31 is formed by a plurality of slightly and uniformly spaced-apart parallel glass plates 33, which can be wetted satisfactorily by liquid crystal. The glass plates 33 may be quadrangular in shape, and their suitable portions may be coupled by resin adhesive spacer means having a predetermined thickness. With such suction member 31 comprising an assembly of a plurality of glass plates 33, the inter-plate gaps have to be exposed to the outside. The glass plates 33 are suitably spaced apart by a distance of 1.0 to 1.5 mm, for instance.

Such suction member 31 is dipped in the liquid crystal trough 27 such that its glass plates 33, or the gaps therebetween, extend upright, as shown in FIG. 2. As a result, liquid crystal in the liquid crystal trough 27 is withdrawn by the capillary action upward through the gaps between the glass plates 33.

The liquid crystal retainer 32 is disposed on top of the suction member 31 comprising the assembly of the glass plates 33. It comprises a felt-like member of ceramic fibers or the like capable of being satisfactorily wetted by liquid crystal. It can be simply constructed by merely placing a stack of a predetermined number of thin ceramic fiber filter sheets on the top of the suction member 31. The liquid crystal retainer 32 retains and is wetted by liquid crystal withdrawn by the capillary action through the gaps of the glass plates 33 of the suction member 31 up to the top thereof.

The method of operating the liquid crystal introduction apparatus having the above construction will now be described.

First, the lower edge of each cell train 12 is spaced apart from the liquid crystal retainer 32 by lowering the holder 26. In this state, the vacuum vessel C is evacuated to purge air from the liquid crystal seal space 17 in each cell.

Then, in this evacuated state the liquid crystal retainer 32 and the inlets 20 located at the lower edge of each cell train 12 are brought into contact with each other by raising the holder 26. In this way, the inlets 20 are held wetted by liquid crystal retained on the liquid crystal retainer 32.

In this state, the inner pressure of the vacuum vessel is gradually increased up to the atmospheric pressure. In this step, the vacuum vessel inner pressure being increased up to atmospheric pressure causes liquid crystal on the liquid crystal retainer 32 to be drawn in the evacuated liquid crystal seal space 17 through the inlet 20.

The cell trains 12, with the liquid crystal seal spaces 17 filled with liquid crystal in this way, are then taken out of the vacuum vessel C, and the inlets 20 are sealed with a sealing resin such as an ultraviolet-ray-setting resin. Each cell train 12 is then cut along the separation lines 13 to separate the individual liquid crystal cells 11.

As described above, the inlet 20, through which liquid crystal is introduced, is brought into contact with the liquid crystal retainer 32 which itself is capable of retaining its shape. Thus, according to the invention, unlike the prior art there is no need for liquid crystal surface control, and constant liquid crystal introduction can be obtained at all times. As a result, there hardly arises the problem of unexpected introduction of air bubbles into the liquid crystal seal space of the cell due to inadequate liquid crystal surface control.

Besides, since the edge of each cell is brought into contact with the liquid crystal retainer 32, instead of the liquid crystal surface the waste of liquid crystal, which might be caused by deposition of excess liquid crystal to the cell edge can be substantially avoided.

Further, it is possible to increase the volume of the liquid crystal trough 27 in which the suction member 31 is loaded. Thus, it is possible to extremely reduce the frequency of replenishing the liquid crystal trough 27 with liquid crystal, thereby facilitating the operation of introducing liquid crystal.

Further, according to the invention, liquid crystal is introduced with the edge of each rectangular cell train 12 held in contact with the liquid crystal retainer 32 having a predetermined area. Thus, even if the cell pitch of the cell train 12 is changed to produce different kinds of liquid crystal cells 11, the liquid crystal introduction operation can be carried out according to the same procedure irrespective of the pitch change. On the other hand, according to the prior art arrangement of FIG. 7, a plurality of narrow liquid crystal boats 8 are used to introduce liquid crystal into different liquid crystal cells in each rectangular cell train, so that the spacing of liquid crystal boats have to be adjusted in dependence of the cell pitch. According to the invention, such an adjustment is unnecessary.

The present invention can be modified variously. For example, various structures for the liquid crystal suction member 31 and liquid crystal retainer 32 conceivable.

Figure 3:
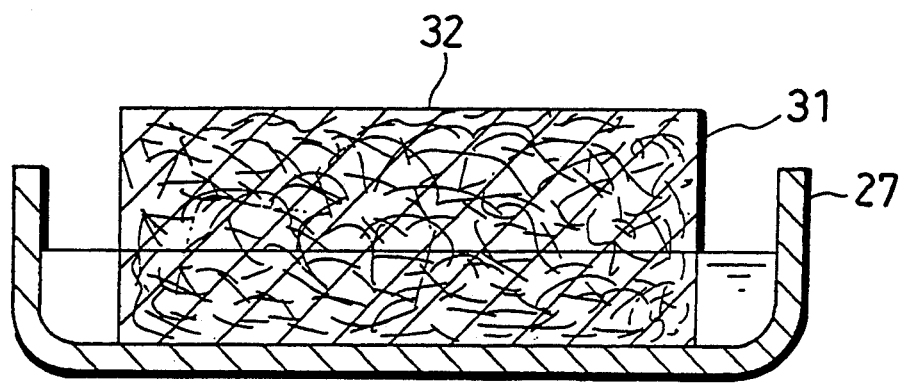
FIG. 3 is a sectional view showing a different example of liquid crystal suction and retention means.

FIG. 3 shows a modification wherein a suction member 31 is a felt block having a substantially flat top surface which functions as a liquid crystal retainer 32.

Figure 4:
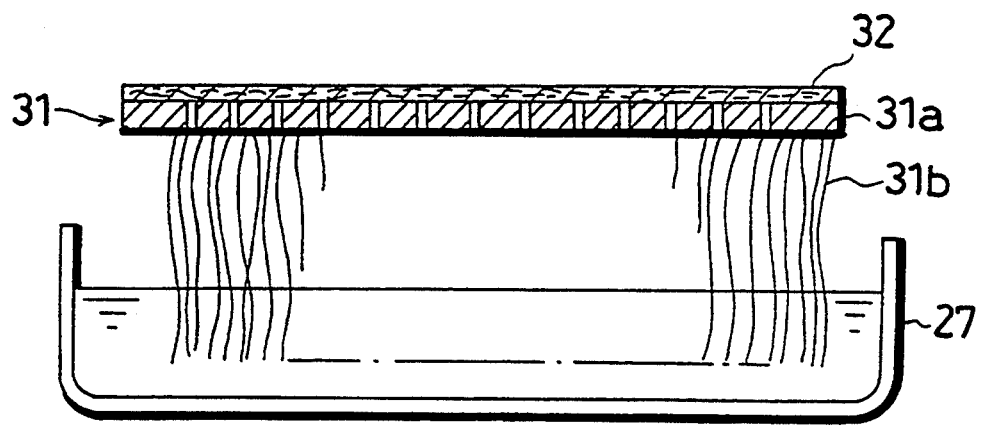
FIG. 4 is a sectional view showing a further example of liquid crystal suction and retention means.

FIG. 4 shows a different modification wherein a suction member 31 comprises a perforated rigid plate 31a and a number of liquid crystal suction strings 31b hanging from the plate 31a. A liquid crystal retainer 32 is a stack of an adequate number of felt-like filter sheets plated on top of the perforated rigid plate 31a.

In this case, unlike the above embodiments, there is no need to provide a large-scale mechanism for vertically moving the holder 26 supporting the liquid crystal trough 27. Instead, the perforated rigid plate 31a may be arranged for vertical movement in a predetermined distance.

Figure 5:
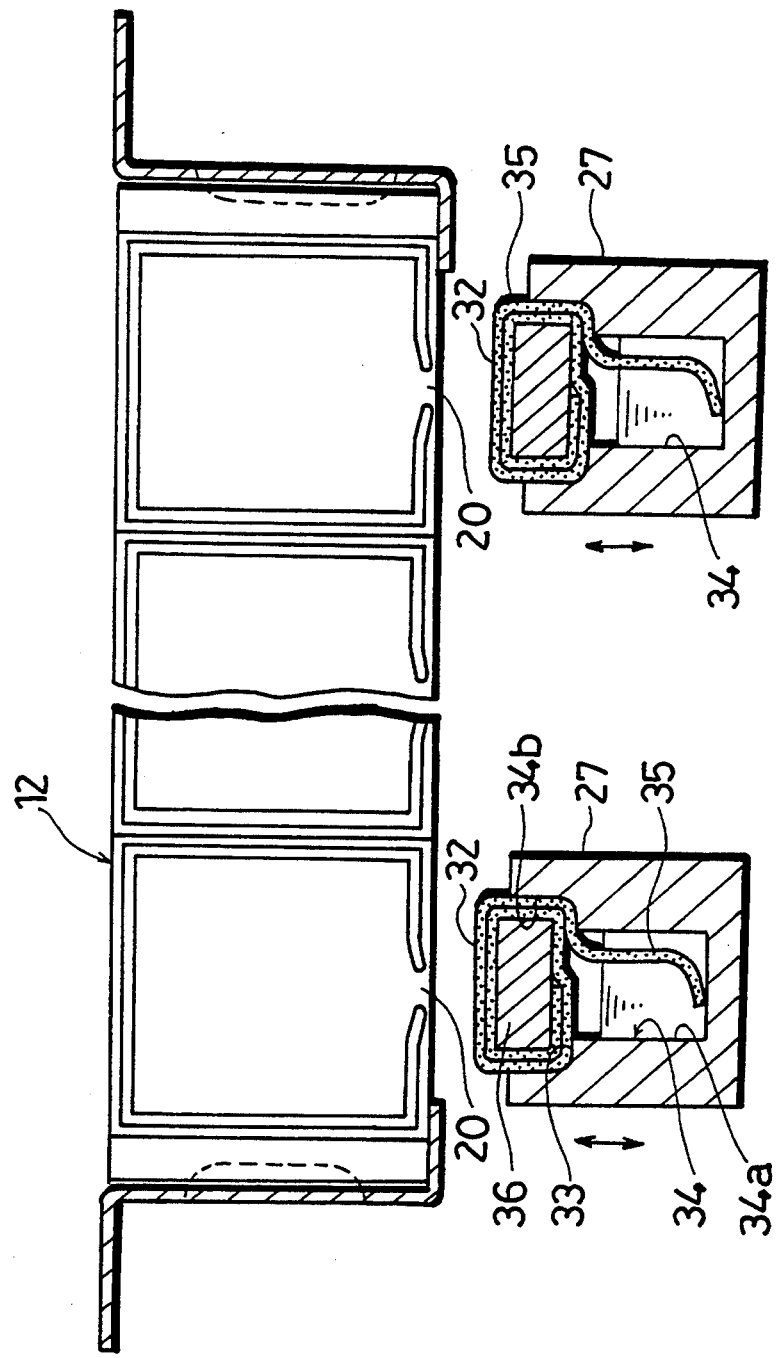
FIG. 5 is a sectional view showing a still further example of liquid crystal suction and retention means.

FIG. 5 shows a further modification which requires a reduced amount of crystal compared to the above embodiments. More specifically, in this modification, a plurality of narrow groove-like liquid crystal troughs 27 are provided in corresponding relation to the respective cell inlets 20 of each cell train 12 held by holding means. Each liquid crystal trough 27 has a groove 34 whose width is increased at steps 33. A predetermined amount of liquid crystal is stored in a lower narrow groove portion 34a, and a core member 36 having a rectangular sectional profile is provided in an upper wider groove portion 34b to rest on the steps 33. A readily wettable cloth piece 35 is wound on the core member 36 such that it partly hangs and is dipped in liquid crystal. Thus, liquid crystal withdrawn by the capillary action can wet the entire cloth piece wound on the core member 36. The portion of the wetted cloth piece 35 wetted by liquid crystal, which covers the top of the core member 36 functions as a liquid crystal retainer.

According to the embodiment of FIG. 5, the cloth piece 35 may be suitably made of blend cloth of polyester and nylon fibers because such cloth is readily wettable with liquid crystal while generating less dust.

The liquid crystal trough 27 may be made of aluminum with Teflon coating. The Teflon coating facilitates recovery of residual liquid crystal.

Figure 6:
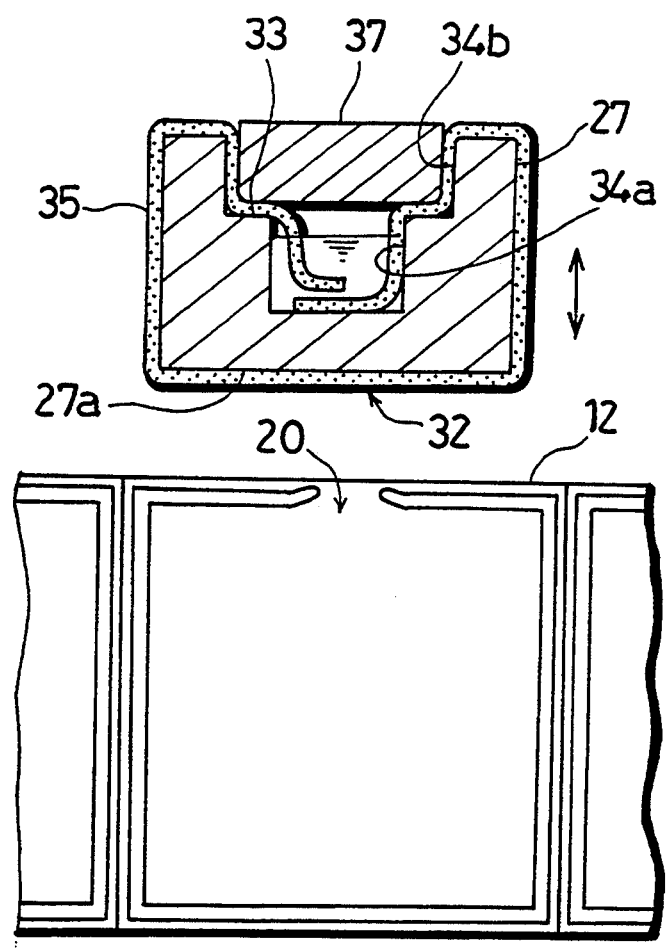
FIG. 6 is a sectional view showing a different embodiment of the liquid crystal introduction apparatus according to the invention.

FIG. 6 shows a modification wherein a liquid crystal trough 27 whose sectional profile is like that of the trough in the embodiment of FIG. 5 has a flat lower surface 27a. A wettable cloth piece 35 is partly dipped in liquid crystal received in a lower groove portion 34a of the trough 27, and partly located on the lower surface 27a of the trough 27. A retainer member 37 for preventing detachment of the cloth piece 35 is an upper groove portion 34b to rest on steps 33. The wettable cloth piece may be like that described before in connection with FIG. 5.

Liquid crystal can permeate the entire cloth piece 35 by capillary action. The portion of the wetted cloth piece 35 which covers the lower surface 27a of the liquid crystal trough 27 functions as a downwardly directed liquid crystal retainer 32.

With the above structure of the liquid crystal retainer 32, the cell train 12 can be located below the downwardly directed liquid crystal retainer 32 with the inlets 20 directed upward, as shown in FIG. 6. A vertical drive means for bringing the inlets 20 into contact with the liquid crystal retainer 32 in vacuum is considered obvious to a person skilled in the art by referring to FIG. 1.

In the case of FIG. 6, it is possible to introduce liquid crystal with the inlets 20 of the liquid crystal cell train 12 directed upward. This means that after the liquid crystal introduction the inlets can be sealed without any need for vertically reversing the cell train. Thus, it is possible to conveniently carry out and automate the successive steps of introducing liquid crystal and sealing of the cell inlet.

The above embodiment and modifications are by no means limitative. For example, the drive mechanism for causing relative movement between the liquid crystal cell train and the liquid crystal retainer may be designed to cause vertical movement of the holding means or the cell train.

Various further changes and modifications are possible without departing from the scope of the invention as set forth in the appended claims.

What is claimed is:

1. An apparatus for introducing liquid crystal into liquid crystal cells comprising:
   holding means for holding each of the liquid crystal cells;
   liquid crystal retention means wetted with liquid crystal drawn by liquid crystal suction means;
   drive means for causing relative movement between said holding means and said liquid crystal retention means to selectively bring a liquid crystal inlet of said each liquid crystal cell into and out of contact with said liquid crystal retention means; and
   a vacuum vessel accommodating said holding meats, liquid crystal suction means, liquid crystal retention means and drive means, said vacuum vessel being capable of varying its inner pressure;
   wherein said liquid crystal retention means comprises a felt member.

2. The apparatus according to claim 1, wherein said liquid crystal suction means comprises a plurality of parallel glass plates which are slightly spaced from each other to form gaps for drawing up the liquid crystal by capillary action.

3. An apparatus for introducing liquid crystal into liquid crystal cells comprising:
   holding means for holding each of the liquid crystal cells;
   liquid crystal retention means wetted with liquid crystal drawn by liquid crystal suction means;
   drive means for causing relative movement between said holding means and said liquid crystal retention means to selectively bring a liquid crystal inlet of said each liquid crystal cell into and out of contact with said liquid crystal retention means; and
   a vacuum vessel accommodating said holding means, liquid crystal suction means, liquid crystal retention means and drive means, said vacuum vessel being capable of varying its inner pressure;
   wherein said liquid crystal retention means is partly dipped in a liquid crystal bath to work also as said liquid crystal suction means for sucking up the liquid crystal to a top surface of said liquid crystal retention means by capillary action.

4. An apparatus for introducing liquid crystal into liquid crystal cells comprising:
   holding means for holding each of the liquid crystal cells;
   liquid crystal retention means wetted with liquid crystal drawn by liquid crystal suction means;
   drive means for causing relative mover between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

wherein said liquid crystal suction means comprises a perforated plate located above a liquid crystal bath, and a plurality of suction strings hanging from the perforated plate to be partly dipped in the liquid crystal bath for sucking up the liquid crystal to said liquid crystal retention means by capillary action.

5. An apparatus for introducing liquid crystal into liquid crystal cells comprising:

holding means for holding each of the liquid crystal cells;

liquid crystal retention means wetted with liquid crystal drawn by liquid crystal suction means;

drive means for causing relative movement between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

wherein said liquid crystal retention means comprises a cloth piece wound about a core member, the cloth piece having one end dipped in a liquid crystal bath to work as said liquid crystal suction means for sucking up the liquid crystal to said liquid crystal retention means by capillary action.

6. An apparatus for introducing liquid crystal into liquid crystal cells comprising:

holding means for holding each of the liquid crystal cells;

liquid crystal retention means wetted with liquid crystal drawn by liquid crystal suction means;

drive means for causing relative movement between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

wherein said liquid crystal retention means is directed downward, said holding means holding said each liquid crystal cell below said liquid crystal retention means with the liquid crystal inlet directed upward.

7. A method for introducing liquid crystal into liquid crystal cells by using a liquid crystal introduction apparatus which comprises:

holding means for holding each of the liquid crystal cells;

liquid crystal retention means wetted with liquid crystal drawn by liquid crystal suction means;

drive means for causing relative movement between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

said method comprising the steps of:

(1) evacuating said vacuum vessel;

(2) bringing said inlet of said each liquid crystal cell into contact with said liquid crystal retention means while said vacuum vessel is held evacuated; and (3) increasing the inner pressure of said vacuum vessel;

wherein said liquid crystal retention means comprises a felt member.

8. The method according to claim 7, wherein said liquid crystal suction means comprises a plurality of parallel glass plates which are slightly spaced from each other to form gaps for drawing up the liquid crystal by capillary action.

9. A method for introducing liquid crystal into liquid crystal cells by using a liquid crystal introduction apparatus which comprises holding means for holding each of the liquid crystal cells;

liquid crystal retention means wetted with liquid crystal drawn by liquid crystal suction means;

drive means for causing relative movement between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

said method comprising the steps of:

(1) evacuating said vacuum vessel;

(2) bringing said inlet of said each liquid crystal cell into contact with said liquid crystal retention means while said vacuum vessel is held evacuated; and (3) increasing the inner pressure of said vacuum vessel; wherein said liquid crystal retention means is partly dipped in a liquid crystal bath to work also as said liquid crystal suction means for sucking up the liquid crystal to a top surface of said liquid crystal retention means by capillary action.

10. A method for introducing liquid crystal into liquid crystal cells by using a liquid crystal introduction apparatus which comprises:

holding means for holding each of the liquid crystal cells;

liquid crystal retention means wetted with liquid crystal drawn by liquid crystal suction means;

drive means for causing relative mover between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

said method comprising the steps of:

(1) evacuating said vacuum vessel;

(2) bringing said inlet of said each liquid crystal cell into contact with said liquid crystal retention means while said vacuum vessel is held evacuated; and (3) increasing the inner pressure of said vacuum vessel;

wherein said liquid crystal suction means comprises a perforated plate located above a liquid crystal bath, and a plurality of suction strings hanging from the perforated plate to be partly dipped in the liquid crystal bath for sucking up the liquid crystal to said liquid crystal retention means by capillary action.

11. A method for introducing liquid crystal into liquid crystal cells by using a liquid crystal introduction apparatus which comprises:

holding means for holding each of the liquid crystal cells;

liquid crystal retention means wetted with liquid crystal drawn by liquid crystal suction means;

drive means for causing relative movement between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

said method comprising the steps of:
  (1) evacuating said vacuum vessel
  (2) bringing said inlet of said each liquid crystal cell into contact with said liquid crystal retention means while said vacuum vessel is held evacuated; and
  (3) increasing the inner pressure of said vacuum vessel;

wherein said liquid crystal retention means comprises a cloth piece wound about a core member, the cloth piece having one end dipped in a liquid crystal bath to work as said liquid crystal suction means for sucking up the liquid crystal to said liquid crystal retention means by capillary action.

12. A method for introducing liquid crystal into liquid crystal cells by using a liquid crystal introduction apparatus which comprises:

holding means for holding each of the liquid crystal cells;

liquid crystal retention means wetted with liquid crystal drawn by liquid crystal suction means.

drive means for causing relative movement between said holding means and said liquid crystal retention means to selectively bring a liquid crystal inlet of said each liquid crystal cell into and out of contact with said liquid crystal retention means; and a vacuum vessel accommodating said holding means, liquid crystal suction means, liquid crystal retention means and drive means, said vacuum vessel being capable of varying its inner pressure;

said method comprising the steps of:
  (1) evacuating said vacuum vessel;
  (2) bringing said inlet of said each liquid crystal cell into contact with said liquid crystal retention means while said vacuum vessel is held evacuated; and
  (3) increasing the inner pressure of said vacuum vessel;

wherein said liquid crystal retention means is directed downward, said holding means holds said each liquid crystal cell below said liquid crystal retention means, said each liquid crystal cell having a liquid crystal inlet directed upward.

* * * * *